United States Patent
Mallegowda

(10) Patent No.: US 10,972,657 B1
(45) Date of Patent: Apr. 6, 2021

(54) LENS COVER DETECTION DURING SPHERICAL VISUAL CONTENT CAPTURE

(71) Applicant: GoPro, Inc., San Mateo, CA (US)

(72) Inventor: Shiva Kumar Belavadi Mallegowda, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/791,827

(22) Filed: Feb. 14, 2020

(51) Int. Cl.
| | |
|---|---|
| *H04N 7/00* | (2011.01) |
| *H04N 5/232* | (2006.01) |
| *H04N 5/225* | (2006.01) |
| *G08B 7/06* | (2006.01) |

(52) U.S. Cl.
CPC .......... *H04N 5/23227* (2018.08); *G08B 7/06* (2013.01); *H04N 5/2252* (2013.01); *H04N 5/2253* (2013.01); *H04N 5/2258* (2013.01); *H04N 5/23238* (2013.01)

(58) Field of Classification Search
CPC ............ H04N 5/23227; H04N 5/2252; H04N 5/2253; H04N 5/2258; H04N 5/23238; G08B 7/06

USPC .......................................... 348/36, 38, 208.6
See application file for complete search history.

(56) References Cited

U.S. PATENT DOCUMENTS

| | | | |
|---|---|---|---|
| 2010/0045773 A1* | 2/2010 | Ritchey ............... | H04N 5/2254 348/36 |
| 2015/0109468 A1* | 4/2015 | Laroia ................. | H04N 5/345 348/208.6 |
| 2016/0301836 A1* | 10/2016 | Hjelmstrom ..... | G08B 13/19628 |

\* cited by examiner

*Primary Examiner* — Jayanti K Patel
*Assistant Examiner* — Richard B Carter
(74) *Attorney, Agent, or Firm* — Esplin & Associates, PC

(57) ABSTRACT

A spherical image capture device may include two lenses, which may be protected by lens covers. During capture of visual content, usage of the lens covers may be checked to determine whether one or both of the lenses are covered by lens covers. Based on one or both of the lenses being covered by lens covers, an alarm may be generated to notify the user about the lens covers.

20 Claims, 4 Drawing Sheets

LENS COVER DETECTION DURING SPHERICAL VISUAL CONTENT CAPTURE

FIELD

This disclosure relates to detecting usage of lens cover during capture of spherical visual content.

BACKGROUND

It may be desirable to protect a camera lens with a lens cover. However, a user may forget that the lens cover is on when image/video capture is started. For example, a spherical camera may include two lens that guide light to two image sensors. An image/video feed from only one of the lens-image sensor pair may be presented on a display as a preview of the image/video being captured, and the user may not be able to see from the preview whether the lens cover is on the other lens. As another example, a user may not be looking at a camera and may start image/video capture operation remotely (e.g., using a remote, using a voice command). The user may not be able to see whether the lens cover is on a lens of the camera.

SUMMARY

This disclosure relates to capturing spherical visual content. An image capture device may include a first image sensor, a second image sensor, a first optical element configured to guide light within a first field of view to the first image sensor, a second optical element configured to guide light within a second field of view to the second image sensor, and/or other components. An overlap of a peripheral portion of the first field of view and a peripheral portion of the second field of view overlap may enable spherical capture of visual content through the first optical element and the second optical element. Lens cover usage information and/or other information may be obtained. The lens cover usage information may characterize usage of a first lens cover with respect to first optical element and/or usage of a second lens cover with respect to the second optical element during capture of the spherical visual content. Whether the first lens cover is covering the first optical element and/or whether the second lens cover is covering the second optical element during the capture of the spherical visual content may be determined based on the lens cover usage information and/or other information. One or more alarms may be generated based on the first lens cover covering the first optical element, the second lens cover covering the second optical element, and/or other information. The alarm(s) may indicate the first lens cover covering the first optical element and/or the second lens cover covering the second optical element during the capture of the spherical visual content.

A system that captures spherical visual content may include one or more electronic storages, one or more processors, and/or other components. An electronic storage may store visual information defining visual content, information relating to visual content, lens cover usage information, information relating to usage of lens cover with respect to optical element, information relating to alarm, and/or other information. In some implementations, the system may include one or more image sensors, one or more optical element, and/or other components. For example, the system may include a first image, a second image sensor, a first optical element, and/or a second optical element.

One or more components of the system may be carried by a housing, such as a housing of an image capture device. For example, the optical element(s) and/or the image sensor(s) of the system may be carried by the housing of an image capture device. The housing may carry other components, such as the processor(s) and/or the electronic storage.

The first image sensor may be configured to generate a first visual output signal conveying first visual information based on light that becomes incident thereon. The first visual information may define first visual content. The second image sensor may be configured to generate a second visual output signal conveying second visual information based on light that becomes incident thereon. The second visual information may define second visual content.

The first optical element may be configured to guide light within a first field of view to the first image sensor. The first field of view may be greater than 180 degrees. The second optical element may be configured to guide light within a second field of view to the second image sensor. The second field of view may be greater than 180 degrees. The first optical element and the second optical element may be carried by the housing such that a peripheral portion of the first field of view and a peripheral portion of the second field of view overlap. The overlap of the peripheral portion of the first field of view and the peripheral portion of the second field of view may enable spherical capture of visual content based on the first visual content and the second visual content.

The processor(s) may be configured by machine-readable instructions. Executing the machine-readable instructions may cause the processor(s) to facilitate capturing spherical visual content. The machine-readable instructions may include one or more computer program components. The computer program components may include one or more of a lens cover usage information component, a cover component, an alarm component, and/or other computer program components.

The lens cover usage information component may be configured to obtain lens cover usage information and/or other information. The lens cover usage information may characterize usage of a first lens cover with respect to first optical element and/or usage of a second lens cover with respect to the second optical element during capture of spherical visual content.

The cover component may be configured to determine whether the first lens cover is covering the first optical element and/or whether the second lens cover is covering the second optical element during the capture of the spherical visual content based on the lens cover usage information and/or other information.

The alarm component may be configured to generate one or more alarms based on the first lens cover covering the first optical element, the second lens cover covering the second optical element, and/or other information. The alarm(s) may indicate the first lens cover covering the first optical element and/or the second lens cover covering the second optical element during the capture of the spherical visual content.

In some implementations, an alarm may include an audible alarm, a visible alarm, a haptic alarm, and/or other alarm. In some implementations, an audible alarm may include one or more beeps. In some implementations, a visible alarm may include one or more lights. In some implementations, a visible alarm may include one or more warnings presented on a display of the image capture device. In some implementations, a haptic alarm includes a vibration of the housing.

In some implementations, an alarm may be turned off responsive to the first lens cover being removed from the first optical element and/or the second lens being removed from the second optical element. In some implementations, an alarm may be turned off responsive to passage of an alarm duration. In some implementations, operation of the image capture device may change from capture of the spherical visual content to capture of non-spherical visual content responsive to the passage of the alarm duration. In some implementations, an option to change operation of the image capture device from capture of the spherical visual content to capture of non-spherical visual content may be presented based on the first lens cover covering the first optical element, the second lens cover covering the second optical element, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
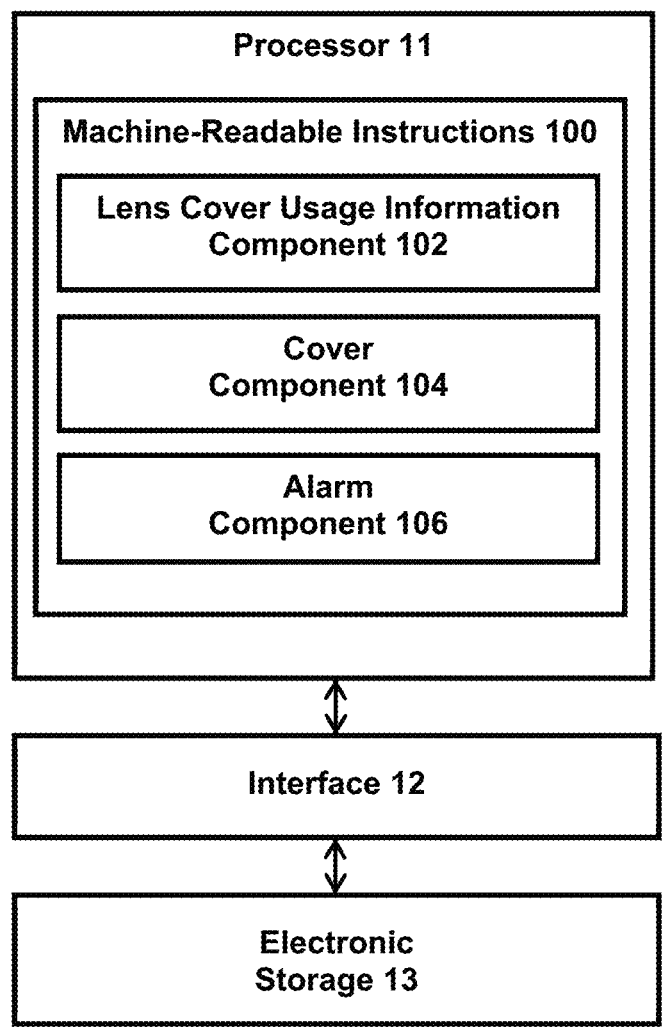
FIG. 1 illustrates an example system that captures spherical visual content.

FIG. 1 illustrates a system 10 for capturing spherical visual content. The system 10 may include one or more of a processor 11, an interface 12 (e.g., bus, wireless interface), an electronic storage 13, and/or other components. An image capture device may include one or more image sensors, one or more optical element, and/or other components. For example, an image capture device may include a first image sensor, a second image sensor, a first optical element configured to guide light within a first field of view to the first image sensor, a second optical element configured to guide light within a second field of view to the second image sensor, and/or other components. An overlap of a peripheral portion of the first field of view and a peripheral portion of the second field of view overlap may enable spherical capture of visual content through the first optical element and the second optical element.

Lens cover usage information and/or other information may be obtained by the processor 11. The lens cover usage information may characterize usage of a first lens cover with respect to first optical element and/or usage of a second lens cover with respect to the second optical element during capture of the spherical visual content. Whether the first lens cover is covering the first optical element and/or whether the second lens cover is covering the second optical element during the capture of the spherical visual content may be determined by the processor 11 based on the lens cover usage information and/or other information. One or more alarms may be generated by the processor 11 based on the first lens cover covering the first optical element, the second lens cover covering the second optical element, and/or other information. The alarm(s) may indicate the first lens cover covering the first optical element and/or the second lens cover covering the second optical element during the capture of the spherical visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, lens cover usage information, information relating to usage of lens cover with respect to optical element, information relating to alarm, and/or other information.

Visual content may refer to content of one or more images and/or one or more videos that may be consumed visually. For example, visual content may be defined within one or more images and/or one or more video frames of a video. A video frame may refer to one or more of an image frame, frame of pixels, encoded frame (e.g., I-frame, P-frame, B-frame), and/or other types of video frame. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Visual information may define visual content and/or other content captured by one or more image capture devices. The visual information may define visual content by including information that defines one or more content, qualities, attributes, features, and/or other aspects of the visual content. For example, the visual information may define visual content of an image, a video frame, and/or a video by including information that makes up the content of the image, the video frame, and/or the video, and/or information that is used to determine the content of the image, the video frame, and/or the video. For instance, the visual information may include information that makes up and/or is used to determine the arrangement of pixels, characteristics of pixels, values of pixels, and/or other aspects of pixels that define visual content of the image, the video frame, and/or the video. For example, the visual information may include information that makes up and/or is used to determine pixels of the image or video frame(s) of the video. Other types of visual information are contemplated.

Visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture).

Spherical visual content may be generated based on light received within a field of view of a single image sensor or within fields of view of multiple image sensors during a capture period. For example, multiple images/videos captured by multiple cameras/image sensors may be combined/stitched together to form the spherical visual content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical visual content.

Figure 3:
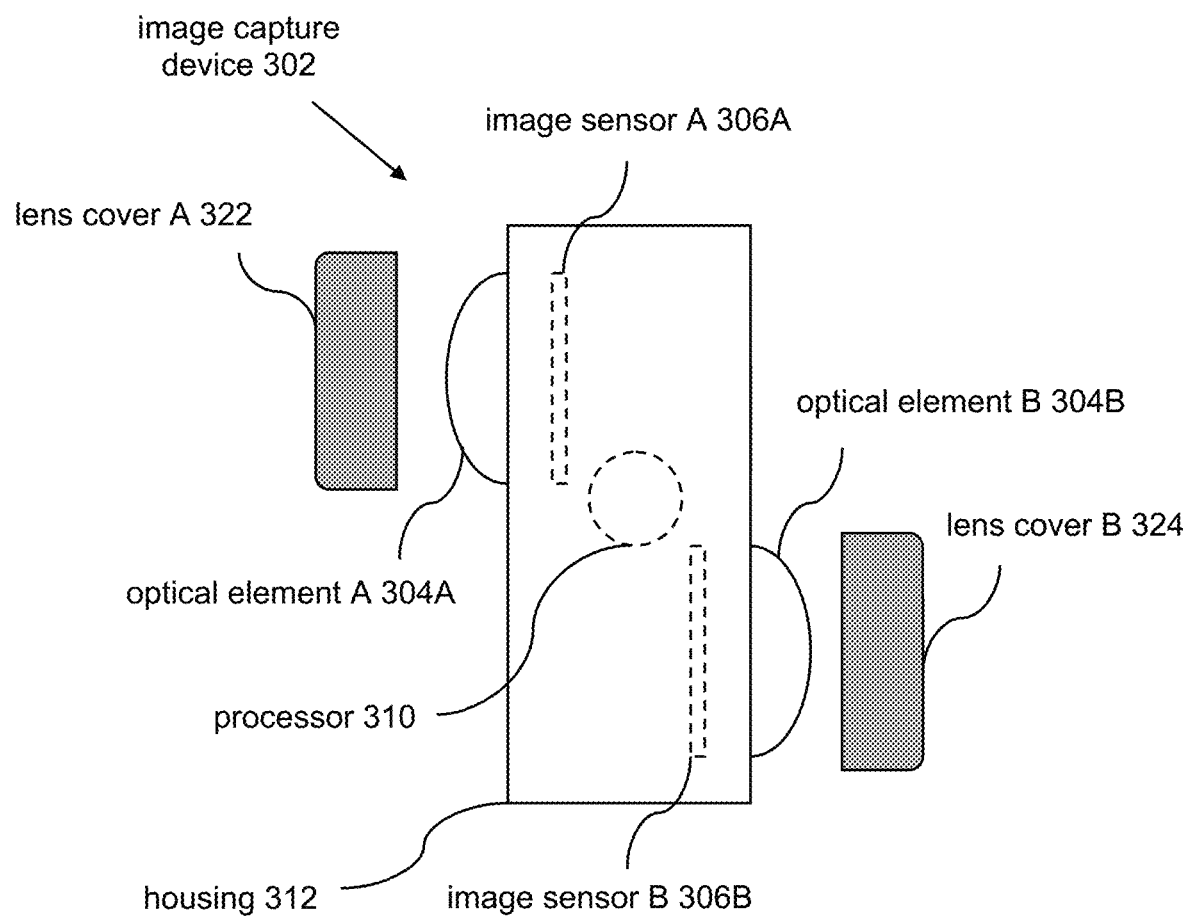
FIG. 3 illustrates an example image capture device.

An image capture device may refer to a device for recording visual information in the form of images, videos, and/or other media. An image capture device may refer to a device captures visual content. An image capture device may capture visual content in form of images, videos, and/or other forms. For example, an image capture device may refer to a camera and/or an image sensor. An image capture device may be a standalone device (e.g., camera) or may be part of another device (e.g., part of a smartphone). FIG. 3 illustrates an example image capture device 302. Visual content may be captured by the image capture device 302 during a capture duration. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element A 304A, an optical element B 304B, an image sensor A 306A, an image sensor B 306B, and/or other components. In some implementations, an image capture device may include a non-spherical image capture device (e.g., having a single optical element and a single image sensor to capture non-spherical visual content). Other configurations of image capture devices are contemplated.

One or more components of the image capture device 302 may be the same as, be similar to, and/or correspond to one or more components of the system 10. For example, the processor 310 may be the same as, be similar to, and/or correspond to the processor 11.

The optical elements 304A, 304B may include instrument(s), tool(s), and/or medium that acts upon light passing through the instrument(s)/tool(s)/medium. For example, the optical elements 304A, 304B may include one or more of lens, mirror, prism, and/or other optical elements. The optical elements 304A, 304B may affect direction, deviation, and/or path of the light passing through the optical elements 304A, 304B. While the optical elements 304A, 304B are shown in a staggered configuration, this is merely an example and other configurations of optical elements are contemplated.

The image sensors 306A, 306B may include sensor(s) that converts received light into output signals. The output signals may include electrical signals. The image sensors 306A, 306B may generate output signals conveying information that defines visual content of one or more images and/or one or more video frames of a video. For example, the image sensors 306A, 306B may include one or more of a charge-coupled device sensor, an active pixel sensor, a complementary metal-oxide semiconductor sensor, an N-type metal-oxide-semiconductor sensor, and/or other image sensors.

The image sensors 306A, 306B may be configured to generate visual output signals conveying visual information (defining visual content of images and/or videos) based on light that becomes incident thereon and/or other information. The optical element A 304A may be configured to guide light within a field of view to the image sensor A 306A, and the image sensor A 306A may be configured to generate visual output signals conveying visual information based on light that becomes incident thereon via the optical element A 304A. The optical element B 304B may be configured to guide light within a field of view to the image sensor B 306B, and the image sensor B 306B may be configured to generate visual output signals conveying visual information based on light that becomes incident thereon via the optical element B 304B. The fields of view of the optical elements 304A, 304B may refer to the extents of the observable world that is seen through the optical elements 304A, 304B. The field of views of the optical elements 304A, 304B may include one or more angles (e.g., vertical angle, horizontal angle, diagonal angle) at which light is received and passed on by the optical elements 304A, 304B. The fields of view of the optical elements 304A, 304B may be the same or different.

The fields of view of the optical elements 304A, 304B may be greater than or equal to 180-degrees. The optical elements 304A, 304B may be carried by the housing 312 such that peripheral portions of the fields of view of the optical elements 304A, 304B overlap. The overlap of the peripheral portions of the fields of view of the optical elements 304A, 304B may enable capture of spherical visual content (e.g., of images and/or videos) based on the visual information conveyed by the output signals of the image sensors 306A, 306B. That is, the overlap of the peripheral portions of the fields of view of the optical elements 304A, 304B may enable spherical capture of visual content based on visual content defined by the visual information of the image sensor A 306A (visual content captured by the image sensor A 306A) and visual content defined by the visual information of the image sensor B 306B (visual content captured by the image sensor B 306B). Separate visual content captured by the image sensors 306A, 306B may be stitched along one or more stitch lines. A stitching line for stitching separate visual content captured by the image sensors 306A, 306B may be positioned within the overlap of the peripheral portions of the fields of view of the optical elements 304A, 304B.

In some implementations, the image capture device 302 may include one or more sensors to generate lens cover usage information. The lens cover usage information may characterize usage of one or more lens covers with respect to one or more optical elements of the image capture device 302. A lens cover may refer to a device that provides protection for a lens. A lens cover may provide protection from damage, such as scratches, chipping, collision, and/or other damage. A lens cover may be a single-piece device or a multi-piece device. A lens cover may be placed on an optical element via one or more attachments mechanisms. For example, a lens cover may be pushed into the housing 312, clipped onto the housing 312, engaged with the housing 312, screwed onto the housing 312, and/or otherwise used to protect the optical elements (e.g., lens).

Usage of a lens cover with respect to an optical element may refer to whether and/or how the lens cover is being used with respect to the optical element. Usage of a lens cover with respect to an optical element may refer to usage of the lens cover with respect to the optical element at one or more points in time and/or one or more durations of time. Usage of a lens cover with respect to an optical element may refer to position, placement, and/or orientation of the lens cover with respect to the optical element.

The lens cover usage information may characterize usage of lens cover(s) with respect to optical element(s) by including information that describes usage of the lens cover(s) with respect to the optical element(s) and/or information that may be used to determine the usage of the lens cover(s) with respect to the optical element(s). For example, the lens cover usage information may include information that describe and/or may be used to determine whether and/or how the lens cover(s) are being used with respect to the optical element(s). Other types of lens cover usage information are contemplated.

The lens cover usage information may be generated based on operation of the sensor(s) of the image capture device 302. The sensor(s) may generate output signals that convey the lens cover usage information and/or information that may be used to determine the lens cover usage information. For example, the sensor(s) may include the image sensor 306, and the usage of a lens cover with respect to the optical element 304 may be determined based on analysis of visual content captured by the image sensors 306A, 306B. For instance, visual content of image(s) and/or video(s) captured through the optical elements 304A, 30B by the image sensors 306A, 306B may be analyzed to determine whether and/or how the lens cover is being used with respect to the optical element. For example, if one or more pixels values (e.g., maximum value) of the visual content is below a threshold corresponding to the black level and/or the noise level (e.g., recording black images/video frames), the cover may be assumed to be on the corresponding optical element (e.g., determining optical element occlusion by the lens cover). In some implementations, the pixel value of the visual content may need to be below the threshold for a duration of time to determine that the cover is covering the optical element.

As another example, the sensor(s) may include mechanical and/or electrical systems that detect whether and/or how the lens cover is being used with respect to the optical element. For instance, the lens cover may include one or more magnets, and placement of the lens on the optical element 304 may be detected by one or more Hall effect sensors carried by the housing 312. Other sensor(s) and other means of detecting usage of lens cover(s) with respect to optical element(s) are contemplated.

For example, the lens cover usage information may characterize usage of a lens cover A 322 with respect to the optical element A 304A and/or usage of a lens cover B 324 with respect to the optical element B 304. Usage of a lens cover with respect to an optical element may refer to whether and/or how the lens cover is being used with respect to the optical element. Usage of a lens cover with respect to an optical element may include usage of the lens over with respect to the optical element at one or more points in time and/or one or more durations of time. Usage of a lens cover with respect to an optical element may include the lens cover being on the lens, the lens cover being off the lens, and/or the lens cover being at a stage between being fully on and fully off the lens. For instance, the lens cover usage information may characterize whether the lens cover A 322 is on or off the optical element A 304A. The lens cover usage information may characterize whether the lens cover B 324 is on or off the optical element B 304B. The lens cover usage information may characterize whether the lens cover is being used so that the lens cover is between on or off (partially pushed in, partially clipped on, partially engaged with, partially screwed on).

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical elements 304A, 304B (e.g., change how light is guided by the optical elements 304A, 304B), and/or facilitate operation of the image sensors 306A, 306B (e.g., change how the received light is converted into information that defines images/videos and/or how the images/videos are post-processed after capture).

The processor 310 may obtain information from the image sensors 306A, 306B, and/or other sensors and/or facilitate transfer of information from the image sensors 306A, 3066, and/or other sensors to another device/component. The processor 310 may be remote from the processor 11 or local to the processor 11. One or more portions of the processor 310 may be part of the processor 11 and/or one or more portions of the processor 11 may be part of the processor 310. The processor 310 may include and/or perform one or more functionalities of the processor 11 shown in FIG. 1.

For example, the processor 310 may use the lens cover usage information to determine whether one or both of the lens covers 322, 324 are covering the optical elements 304A, 304B, and provide alarm(s) based on the one or both of the lens covers 322, 324 covering the optical elements 304A, 304B during capture of spherical visual content (during capture duration). Such provision of alarm may enable a user to know when the view of one or both of the optical elements 304A, 304B are obstructed by the lens cover when capturing spherical visual content.

Referring back to FIG. 1, the system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device. For instance, optical element(s) and/or image sensor(s) of the system 10 may be carried by the housing of the image capture device. The housing may carry other components, such as the processor 11, the electronic storage 13. References to a housing of an image capture device may refer to the image capture device, and vice versa.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate capturing spherical visual content. The machine-readable instructions 100 may include one or more computer program components. The machine-readable instructions 100 may include one or more of a lens cover usage information component 102, a cover component 104, an alarm component 106, and/or other computer program components The lens cover usage information component 102 may be configured to obtain lens cover usage information and/or other information. Obtaining lens cover usage information may include one or more of accessing, acquiring, analyzing, determining, examining, identifying, loading, locating, opening, receiving, retrieving, reviewing, selecting, storing, and/or otherwise obtaining the lens cover usage information. The lens cover usage information component 102 may obtain lens cover usage information from one or more locations. For example, the lens cover usage information component 102 may obtain lens cover usage information from a storage location, such as the electronic storage 13, electronic storage of information and/or signals generated by one or more sensors, electronic storage of a device accessible via a network, and/or other locations. The lens cover usage information component 102 may obtain lens cover usage information from one or more hardware components (e.g., an image sensor, Hall effect sensor) and/or one or more software components (e.g., software running on an image capture device). The lens cover usage information may be stored in a single file and/or across multiple files. For example, a single file may contain lens cover usage information for a single lens/optical element or for multiple lens/optical elements. Lens cover usage information for separate lens/optical element may be stored within separate files. Other storage of lens cover usage information are contemplated.

The lens cover usage information may characterize usage of one or more lens covers with respect to one or more optical elements during capture of visual content. For example, referring to FIG. 3, the lens cover usage information may characterize usage of the lens cover A 322 with respect to the optical element A 304A and/or the usage of the lens cover B 324 with respect to the optical element B 304B during capture of spherical visual content. For instance, the lens cover usage information may characterize whether and/or how the lens covers 322, 324 are being used with respect to the optical elements 304A, 304B. The lens cover usage information may characterize usage of the lens covers 322, 324 with respect to the optical elements 304A, 304B at one or more points in time and/or one or more durations of time. The lens cover usage information may characterize whether the lens covers 322, 324 are on the optical elements 304A, 304B, whether the lens covers 322, 324 are off the optical elements 304A, 304B, and/or whether the lens covers 322, 324 are at a stage between being fully on and fully off the optical elements 304A, 304B The cover component 104 may be configured to determine usage of one or more lens covers with respect to one or more optical elements during capture of visual content. Usage of lens cover with respect to an optical element may include the lens cover covering the optical element, the lens cover not covering the optical element, and/or other usage of the lens cover with respect to the optical element. A lens cover covering an optical element may include the lens cover fully or partially covering the optical element.

Usage of lens cover(s) with respect to optical element(s) during capture of visual content may be determined based on the lens cover usage information and/or other information. For example, referring to FIG. 3, the cover component 104 may be configured to determine usage of the lens cover A 322 with respect to the optical element A 304A and/or the usage of the lens cover B 324 with respect to the optical element B 304B during capture of spherical visual content. The cover component 104 may be configured to determine whether the lens cover A 322 is covering the optical element A 304A and/or whether the lens cover B 324 is covering the optical element B 304B during the capture of the spherical visual content based on the lens cover usage information and/or other information. For instance, the cover component 104 may determine whether and/or how the lens covers 322, 324 are being used with respect to the optical elements 304A, 304B. The cover component 104 may determine whether the lens covers 322, 324 are on the optical elements 304A, 304B. The cover component 104 may determine whether the lens covers 322, 324 are off the optical elements 304A, 304B.

In some implementations, the cover component 104 may determine whether the lens covers are covering or not covering the optical element based on analysis of the visual content captured through the optical elements. For example, based on one or more pixels values (e.g., maximum value, averaged value) of the visual content being below a threshold corresponding to the black level and/or the noise level (e.g., recording black images/video frames), the lens cover may be determined to be covering the optical element. Based on one or more pixels values (e.g., maximum value, averaged value) of the visual content being above a threshold corresponding to the black level and/or the noise level (e.g., recording black images/video frames), the lens cover may be determined to be not covering the optical element. The pixel values used to determine usage of the lens cover may be the pixel values at different time points within the capture duration and/or over time duration within the capture duration. For example, the pixel value of the visual content may need to be below/above the threshold for a minimum duration of time for the cover component 104 to determine that the lens cover is covering/not covering the optical element. The minimum duration to determine lens cover being on and off the optical element may be the same or different.

Figure 4A:
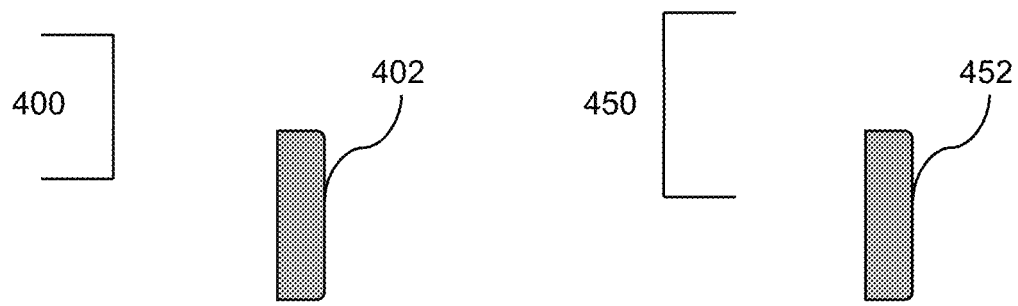
FIGS. 4A, 4B, and 4C illustrate example lens cover usage.
Figure 4B:
Figure 4C:

In some implementations, the cover component 104 may determine whether the lens covers are covering or not covering the optical element based on stages of lens cover usage. For example, the cover component 104 may determine whether the lens covers are covering or not covering the optical element based on whether the lens cover is fully on the optical element, fully off the optical element, or partially on/off the optical element. FIGS. 4A, 4B, and 4C illustrate example lens cover usage. In FIGS. 4A, 4B, and 4C, a lens cover 402 may be placed on an optical element via engagement with a protruding portion 400 of an image capture device. In FIGS. 4A, 4B, and 4C, a lens cover 452 may be placed on an optical element via engagement with a recessed portion 450 of an image capture device. Other engagement of the lens covers with the image capture device to cover/protect optical elements are contemplated.

In FIG. 4A, the cover component 104 may determine that the lens cover 402 is not covering the optical element based on the lens cover 402 not being engaged with the protruding portion 400. The cover component 104 may determine that the lens cover 402 is fully off the optical element based on the lens cover 402 not being engaged with the protruding portion 400. The cover component 104 may determine that the lens cover 402 is not covering the optical element based on the lens cover 402 being fully off the optical element.

The cover component 104 may determine that the lens cover 452 is not covering the optical element based on the lens cover 452 not being engaged with the recessed portion 450. The cover component 104 may determine that the lens cover 452 is fully off the optical element based on the lens cover 452 not being engaged with the recessed portion 450. The cover component 104 may determine that the lens cover 405 is not covering the optical element based on the lens cover 452 being fully off the optical element.

In FIG. 4B, the cover component 104 may determine that the lens cover 402 is covering the optical element based on the lens cover 402 being partially engaged with the protruding portion 400 (e.g., partially pushed on the protruding portion 400, partially clipped on the protruding portion 400, partially screwed on the protruding portion 400). The cover component 104 may determine that the lens cover 402 is partially on/off the optical element based on the lens cover 402 being partially engaged with the protruding portion 400. The cover component 104 may determine that the lens cover 402 is covering the optical element based on the lens cover 402 being partially on/off the optical element.

The cover component 104 may determine that the lens cover 452 is covering the optical element based on the lens cover 452 being partially engaged with the recessed portion 450 (e.g., partially pushed into the recessed portion 450, partially clipped into the recessed portion 450, partially screwed into the recessed portion 450). The cover component 104 may determine that the lens cover 452 is partially on/off the optical element based on the lens cover 452 being partially engaged with the recessed portion 450. The cover component 104 may determine that the lens cover 452 is covering the optical element based on the lens cover 452 being partially on/off the optical element.

In FIG. 4C, the cover component 104 may determine that the lens cover 402 is covering the optical element based on the lens cover 402 being fully engaged with the protruding portion 400 (e.g., fully pushed on the protruding portion 400, fully clipped on the protruding portion 400, fully screwed on the protruding portion 400). The cover component 104 may determine that the lens cover 402 is fully on the optical element based on the lens cover 402 being fully engaged with the protruding portion 400. The cover component 104 may determine that the lens cover 402 is covering the optical element based on the lens cover 402 being fully on the optical element.

The cover component 104 may determine that the lens cover 452 is covering the optical element based on the lens cover 452 being fully engaged with the recessed portion 450 (e.g., fully pushed into the recessed portion 450, fully clipped into the recessed portion 450, fully screwed into the recessed portion 450). The cover component 104 may determine that the lens cover 452 is fully on the optical element based on the lens cover 452 being fully engaged with the recessed portion 450. The cover component 104 may determine that the lens cover 452 is covering the optical element based on the lens cover 452 being fully on the optical element.

The alarm component 106 may be configured to generate one or more alarms based on usage of one or more lens covers with respect to one or more optical elements during capture of visual content and/or other information. For example, referring to FIG. 3, the alarm component 106 may be configured to generate one or more alarms based on the lens cover A 322 covering the optical element A 304A, the lens cover B 324 covering the optical element B 304B and/or other information. An alarm may refer to a signal (for attention), a warning, a message, and/or other types of communication for bringing attention to a thing, a circumstance, and/or a situation. The alarm component 106 may generate the alarm(s) as data, electronic signal, and/or physically observable event (e.g., through one or more user interface devices, such as a display, a speaker, and/or a vibration generator/motor).

An alarm may indicate usage of one or more lens covers with respect to one or more optical elements during capture of visual content. For example, the alarm(s) generated by the alarm component 106 may indicate the lens cover A 322 covering the optical element A 304A and/or the lens cover B 324 covering the optical element B 304B during the capture of the spherical visual content. An alarm may include a warning to one or more users of the image capture device that the lens cover(s) are covering the optical element(s) during capture of visual content. In some implementations, an alarm may be specific as to which of the optical elements are covered by lens cover. For example, the image capture device may include multiple lens, and an alarm may be a general alarm that lens covers are covering some or all of the lens, or an alarm may be specific as to which of the lens is covered by lens cover. Such provision of alarm may remind the user(s) to remove the lens cover during capture of visual content.

An alarm may include an audible alarm, a visible alarm, a haptic alarm, and/or other alarm. An audible alarm may refer to an alarm that is audibly provided. An audible alarm may be provided using sound. For example, responsive to a lens cover covering an optical element of an image capture device during visual content capture, the image capture device may generate and/or playback sounds (using speaker (s) of the image capture device) that the lens cover is covering/on the optical element. The audible alarm may include words (e.g., words describing lens cover on the optical element, words instructing the user to remove lens cover from the optical element), non-word sounds (e.g., one or more beeps, music), and/or other sounds.

A visible alarm may refer to an alarm that is visibly provided. A visible alarm may be provided using light. For example, responsive to a lens cover covering an optical element of an image capture device during visual content capture, the image capture device may generate light (using display(s) and/or indicator light(s) of the image capture device) associated with the lens cover covering the optical element. The visible alarm may include one or more colors, static and/or dynamic light (e.g., blinking light), depiction of words (e.g., presenting on display(s) statement/warning about lens cover on the optical element, presenting on display(s) statement instructing the user to remove lens cover from the optical element), and/or other visible alarm.

A haptic alarm may refer to an alarm that is haptically provided. A haptic alarm may be provided using touch and/or motion. For example, responsive to a lens cover covering an optical element of an image capture device during visual content capture, the image capture device/ housing of the image capture device may be vibrated (using motor(s), vibration generator, and/or haptic generator(s) of the image capture device). The vibration of the image capture device may include continuous vibration (for a period of time) and/or periodic vibration. The vibration may indicate to the user of the image capture device that the lens cover is covering the optical element. Use of other haptics are contemplated.

In some implementations, an alarm may be turned off responsive to a change in usage of the lens cover(s) with respect to the optical element(s). An alarm may be turned off responsive to a lens cover being removed from the optical element so that the lens cover is no longer covering the optical element during capture of visual content. For example, referring to FIG. 3, when the capture of image(s)/video(s) are initialed on the image capture device 302, the usage of the lens covers 322, 324 may be checked with respect to the optical elements 304A, 304B, and an alarm may be generated responsive to one or both of the lens covers 322, 324 covering the optical elements 304A, 304B. The usage of the lens covers 322, 324 may be monitored to detect when the appropriate lens cover(s) is removed from the optical element(s) so that the optical element(s) are no longer covered by the lens cover(s). When the removal of lens cover(s) is detected, the alarm may be turned off.

In some implementations, an alarm may be turned off responsive to passage of an alarm duration. An alarm duration may refer to a duration of time for which alarm is provided (e.g., visually, audibly, haptically). After passage of this duration of time, the alarm may be turned off. In some implementations, operation of the image capture device may change from capture of the spherical visual content to capture of non-spherical visual content responsive to the passage of the alarm duration. For example, referring to FIG. 3, one of the optical element 304A, 304B may be covered by a lens cover during capture of spherical visual content. After passage of the alarm duration, rather than allowing spherical capture to continue (and consume resources by operating an image sensor that is capturing dark images), the image capture device 302 may switch from capturing spherical visual content to capturing non-spherical visual content through the non-obstructed optical element.

In some implementations, an option to change operation of the image capture device from capture of the spherical visual content to capture of non-spherical visual content may be presented based on usage of the lens cover(s) with respect to the optical element(s). For example, referring to FIG. 3, responsive to one of the optical element 304A, 304B being covered by a lens cover during capture of spherical visual content, an option may be provided to a user by the image capture device 302. For instance, a display of the image capture device 302 may present a message that asks the user whether operation of the image capture device should be changed from capture of the spherical visual content to capture of non-spherical visual content. The user may interact with the image capture device 302 to change the operation of the image capture device.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
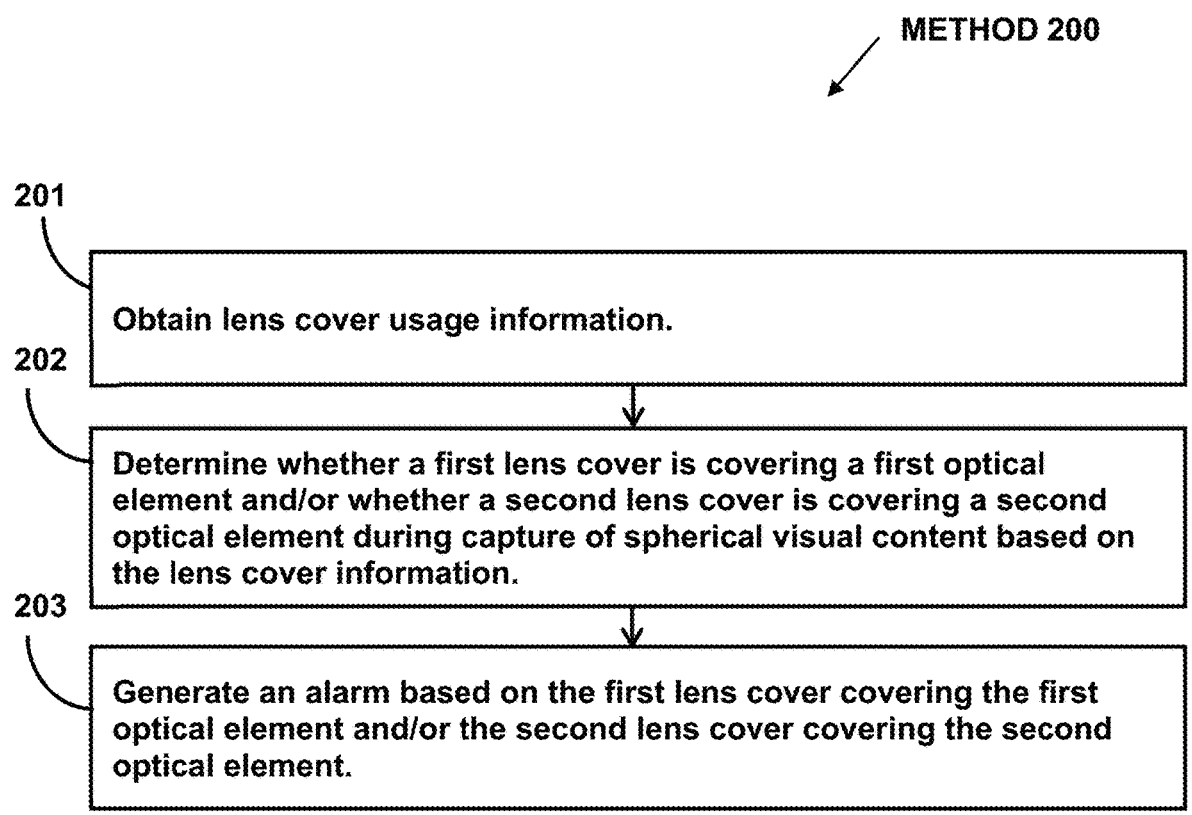
FIG. 2 illustrates an example method for capturing spherical visual content.

FIG. 2 illustrates method 200 for capturing spherical visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a first image sensor, a second image sensor, a first optical element configured to guide light within a first field of view to the first image sensor, a second optical element configured to guide light within a second field of view to the second image sensor, and/or other components. An overlap of a peripheral portion of the first field of view and a peripheral portion of the second field of view overlap may enable spherical capture of visual content through the first optical element and the second optical element.

At operation 201, lens cover usage information and/or other information may be obtained. The lens cover usage information may characterize usage of a first lens cover with respect to first optical element and/or usage of a second lens cover with respect to the second optical element during capture of the spherical visual content. In some implementation, operation 201 may be performed by a processor component the same as or similar to the lens cover usage information component 102 (Shown in FIG. 1 and described herein).

At operation 202, whether the first lens cover is covering the first optical element and/or whether the second lens cover is covering the second optical element during the capture of the spherical visual content may be determined based on the lens cover usage information and/or other information. In some implementation, operation 202 may be performed by a processor component the same as or similar to the cover component 104 (Shown in FIG. 1 and described herein).

At operation 203, one or more alarms may be generated based on the first lens cover covering the first optical element, the second lens cover covering the second optical element, and/or other information. The alarm(s) may indicate the first lens cover covering the first optical element and/or the second lens cover covering the second optical element during the capture of the spherical visual content. In some implementation, operation 203 may be performed by a processor component the same as or similar to the alarm component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device that captures spherical visual content, the image capture device comprising:
   a housing;
   a first image sensor carried by the housing and configured to generate a first visual output signal conveying first visual information based on light that becomes incident thereon, the first visual information defining first visual content;
   a second image sensor carried by the housing and configured to generate a second visual output signal conveying second visual information based on light that becomes incident thereon, the second visual information defining second visual content;
   a first optical element carried by the housing and configured to guide light within a first field of view to the first image sensor, the first field of view being greater than 180 degrees;
   a second optical element carried by the housing and configured to guide light within a second field of view to the second image sensor, the second field of view being greater than 180 degrees, the first optical element and the second optical element carried by the housing such that a peripheral portion of the first field of view and a peripheral portion of the second field of view overlap, the overlap of the peripheral portion of the first field of view and the peripheral portion of the second field of view enabling spherical capture of visual content based on the first visual content and the second visual content; and one or more physical processors carried by the housing, the one or more physical processors configured by machine-readable instructions to:

obtain lens cover usage information, the lens cover usage information characterizing usage of a first lens cover with respect to first optical element and/or usage of a second lens cover with respect to the second optical element during capture of the spherical visual content;

determine whether the first lens cover is covering the first optical element and/or whether the second lens cover is covering the second optical element during the capture of the spherical visual content based on the lens cover usage information; and generate an alarm based on the first lens cover covering the first optical element and/or the second lens cover covering the second optical element, the alarm indicating the first lens cover covering the first optical element and/or the second lens cover covering the second optical element during the capture of the spherical visual content.

2. The image capture device of claim 1, wherein the alarm includes an audible alarm, a visible alarm, and/or a haptic alarm.

3. The image capture device of claim 2, wherein the audible alarm includes one or more beeps.

4. The image capture device of claim 2, wherein the visible alarm includes one or more lights.

5. The image capture device of claim 2, wherein the visible alarm includes a warning presented on a display of the image capture device.

6. The image capture device of claim 2, wherein the haptic alarm includes a vibration of the housing.

7. The image capture device of claim 1, wherein the alarm is turned off responsive to the first lens cover being removed from the first optical element and/or the second lens being removed from the second optical element.

8. The image capture device of claim 1, wherein the alarm is turned off responsive to passage of an alarm duration.

9. The image capture device of claim 8, wherein operation of the image capture device changes from the capture of the spherical visual content to capture of non-spherical visual content responsive to the passage of the alarm duration.

10. The image capture device of claim 1, wherein an option to change operation of the image capture device from the capture of the spherical visual content to capture of non-spherical visual content is presented based on the first lens cover covering the first optical element and/or the second lens cover covering the second optical element.

11. A method for capturing spherical visual content, the method performed by an image capture device including one or more processors, a first image sensor, a second image sensor, a first optical element configured to guide light within a first field of view to the first image sensor, and a second optical element configured to guide light within a second field of view to the second image sensor, an overlap of a peripheral portion of the first field of view and a peripheral portion of the second field of view overlap enabling spherical capture of visual content through the first optical element and the second optical element, the method comprising:

obtaining, by the one or more processors, lens cover usage information, the lens cover usage information characterizing usage of a first lens cover with respect to first optical element and/or usage of a second lens cover with respect to the second optical element during capture of the spherical visual content;

determining, by the one or more processors, whether the first lens cover is covering the first optical element and/or whether the second lens cover is covering the second optical element during the capture of the spherical visual content based on the lens cover usage information; and generating, by the one or more processors, an alarm based on the first lens cover covering the first optical element and/or the second lens cover covering the second optical element, the alarm indicating the first lens cover covering the first optical element and/or the second lens cover covering the second optical element during the capture of the spherical visual content.

12. The method of claim 11, wherein the alarm includes an audible alarm, a visible alarm, and/or a haptic alarm.

13. The method of claim 12, wherein the audible alarm includes one or more beeps.

14. The method of claim 12, wherein the visible alarm includes one or more lights.

15. The method of claim 12, wherein the visible alarm includes a warning presented on a display of the image capture device.

16. The method of claim 12, wherein the haptic alarm includes a vibration of the housing.

17. The method of claim 11, wherein the alarm is turned off responsive to the first lens cover being removed from the first optical element and/or the second lens being removed from the second optical element.

18. The method of claim 11, wherein the alarm is turned off responsive to passage of an alarm duration.

19. The method of claim 18, wherein operation of the image capture device changes from the capture of the spherical visual content to capture of non-spherical visual content responsive to the passage of the alarm duration.

20. The method of claim 11, wherein an option to change operation of the image capture device from the capture of the spherical visual content to capture of non-spherical visual content is presented based on the first lens cover covering the first optical element and/or the second lens cover covering the second optical element.

\* \* \* \* \*